March 15, 1960   J. W. SEATON   2,929,017
QUADRIPOLE MAGNETIC AMPLIFIER
Filed Oct. 9, 1956

INVENTOR.
John W. Seaton
BY
W. E. Thibodeau, A. W. Pew & J. P. Edgerton
Attorneys.

United States Patent Office 2,929,017
Patented Mar. 15, 1960

2,929,017

QUADRIPOLE MAGNETIC AMPLIFIER

John W. Seaton, Silver Spring, Md.

Application October 9, 1956, Serial No. 614,995

4 Claims. (Cl. 323—48)

(Granted under Title 35, U.S. Code (1952), sec. 266)

The invention described herein may be manufactured and used by or for the Government for governmental purposes without payment to me of any royalty thereon.

This invention relates to transformers and more particularly to magnetic amplifiers and converters.

It is well known that low-frequency or D.-C. signals can often be amplified more easily if these signals are converted to a high-frequency signal of amplitude proportional to the low-frequency input signal. The present invention provides a rugged and compact device for this purpose. A preferred form of the device comprises a cylindrical ferromagnetic core with a power input that applies an alternating gradient magnetic field along the cylinder. The input signal is used to change the permeability of one half the cylinder so that an output signal occurs when the core is unbalanced.

An object of this invention is to provide a device which converts and amplifies a low-frequency or D.-C. signal into a modulated high-frequency signal of greater amplitude.

Another object is to provide such a device that is small in size.

A further object is to provide such a device which is unaffected by an uniform magnetic field such as the earth's field.

Still further objects are to achieve the above with a device that is sturdy, simple, and reliable, yet cheap and easy to manufacture.

The specific nature of the invention as well as other objects, uses, and advantages thereof will clearly appear from the following description and from the accompanying drawing, in which.

Figure 1:
Fig. 1 is an elevation of a core and power winding, partially in section, in accordance with this invention.
Figure 2:
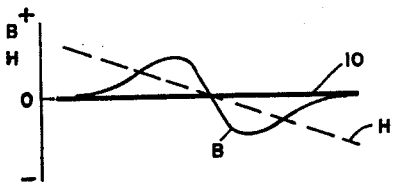
Fig. 2 is a representation of how the magnetic flux density varies along a rod in a gradient magnetic field.

As seen in Fig. 1, a rod 10 of ferromagnetic material has a coil of wire 12 wound symmetrically on it. From the midpoint of the rod to one end the coil 12 is wound in one direction and on the other side of the midpoint of the rod the coil is wound in the opposite direction. When a current of electricity is passed through the coil 12, it produces a gradient magnetizing force H as shown in Fig. 2. This magnetizing force causes a flux density B in the rod distributed as shown. The rod is not magnetized in the form of a simple bar magnet but it has four poles—that is, the core is a quadripole. The flux density in any particular region of the rod will depend upon the permeability of the rod; but if the rod is symmetrical about its midpoint the net flux density will be zero. If the current in coil 12 is alternating, the gradient force will also be alternating, but the magnetization pattern will remain unchanged. If the permeabilities of the two sides of the rod are different, the force H will produce unequal flux densities on either side of the midpoint and there will be some net flux density for the rod as a whole.

Figure 3:
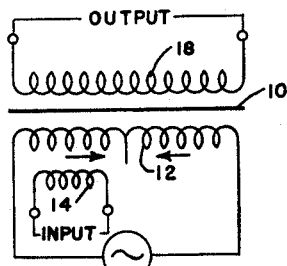
Fig. 3 is a schematic view of windings on a device in accordance with this invention.

Coil 14, Fig. 3, is asymmetrical to the midpoint of the rod, being wound between the midpoint and one end. A current in coil 14 will produce a magnetizing force at one side which will change the permeability of that side. It is typical of ferromagnetic material that the permeability is different for different values of magnetizing forces. The complete system shown in Fig. 3 comprises a high-frequency (200 kc./s., for example) alternator 16 connected across coil 12, coil 14, and an output coil 18. Coil 18 is symmetrical about the midpoint and wound all in the same direction. Thus a D.C. signal applied across coil 14 will produce a change in the net flux density through the rod which will induce a voltage in coil 18.

Likewise, an alternating current applied to coil 14 will produce an alternating magnetizing force which will cause permeability changes in one side of the rod. The result will be an output signal across the load at the frequency of the alternator 16 modulated at twice the frequency of the input signal. The amplitude of the output signal is a function of the amplitude of the input signal.

Figure 4:
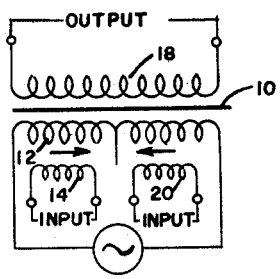

The device shown in Fig. 4 is adapted for use as a discriminating detector or a phase detector. In addition to power coil 12 and output coil 18 on rod 10 there are two input coils, 14 and 20. Input coil 14 extends on one side of the midpoint of the rod and coil 20 on the other side. The two coils together are symmetrical to the midpoint of the rod. With alternating current applied to coil 12 and balanced in-phase input signals to coils 14 and 20, no signal appears on coil 18 as explained above. If the input signals to coils 14 and 20 are unequal a voltage will be induced in coil 18 proportional to the difference of the inputs. Likewise if the phases of alternating input signals are different, an induced voltage proportional to the phase shift will occur in coil 18.

Figure 5:
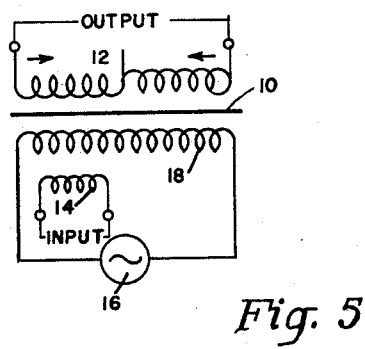
Figs. 4 and 5 are schematic views of modifications.

Fig. 5 represents a device of the same physical construction of Fig. 3 connected in a different manner. The alternator 16 is connected across coil 18 which is all wound in the same direction. The output signal occurs on coil 12 which is wound with the two sides opposing. The input signal is connected across asymmetric coil 14. When no current is flowing in coil 14, the flux density produced by the alternator in rod 10 will be symmetrical. No net voltage will be in coil 12 as the voltages in the two sides will be opposite. When the permeability of one side of the rod is changed by a current in coil 14, a net voltage will be induced because the flux density produced by coil 18 will be different in the two sides of the rod.

Figure 6:
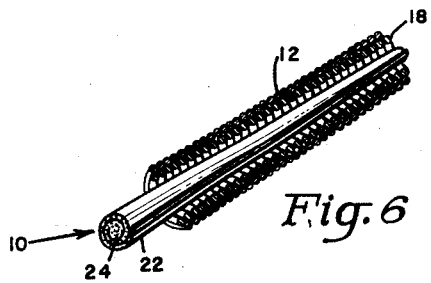
Fig. 6 is a perspective view of a device in accordance with this invention with the windings shown partially cut away.

Fig. 6 shows a preferred construction of the ferromagnetic rod 10 as well as the winding of the coils on it. For high frequency operation (such as 200 kc./s.) a solid metal rod is unsatisfactory. A ferrite rod could be used; however, a spirally rolled rod is illustrated and explained. The spiral construction results in a magnetically solid rod in which there is not a complete circuit for electrical eddy currents. In typical construction a sheet of ferromagnetic metal 22, such as "Mumetal" or "Permalloy," 4 inches long, 0.5 inch wide and 0.001 inch thick is wound about a central axis to form a rod of generally cylindrical shape 0.050 inch in diameter and 4 inches long. Insulating material 24, such as magnesium oxide, is placed between the revolutions of the spiral to block the eddy currents.

Although the term "ferromagnetic" is used, it will be understood by those skilled in the art that any material the permeability of which changes with a varying magnetizing force may be used.

It will be apparent that the embodiments shown are only exemplary and that various modifications can be made in construction, materials, and arrangement within the scope of the invention as defined in the appended claims.

I claim:

1. A fast acting magnetic device which converts and amplifies a low frequency signal into a modulated high frequency signal of greater amplitude, said device comprising in combination: a ferromagnetic rod, a first coil of wire wound on said rod so that the application of a current thereto applies a symmetrical magnetic field to said rod about the midpoint thereof, a second coil of wire wound on the rod so that the application of a current thereto applies equal but opposing magnetic fields on opposite sides of said rod about the midpoint thereof, means applying an alternating current power signal across one of said first and second coils, the voltage across the other of said first and second coils being the output signal of said device, a third coil of wire wound on said rod so that the application of a current thereto applies an asymmetrical magnetic field to said rod about the midpoint thereof, and means for applying an input signal to said third coil having a relatively low frequency with respect to said alternating current power signal, said input signal changing the permeability of one side of said rod to a greater extent than the permeability of the other side of said rod in accordance with the variations of said input signal, the output signal of said device obtained across the other of said first and second coils thereby being an alternating current signal having the same frequency as said alternating current power signal and modulated in accordance with said input signal at twice the frequency thereof.

2. A fast acting magnetic device which converts and amplifies a low frequency signal into a modulated high frequency signal of greater amplitude, said device comprising in combination: a ferromagnetic rod, a first coil of wire wound all in the same direction on said rod symmetrical about the midpoint thereof, the voltage across said first coil being the output signal of said device, a second coil of wire wound on the rod symmetrical about the midpoint thereof, said second coil being wound in one direction on one side of the midpoint and in the opposite direction on the other side of the midpoint, means applying an alternating current power signal across said second coil, the voltage induced in said first coil being substantially zero due to the opposing effect provided by the oppositely wound portions of said second coil, a third coil of wire wound all in the same direction on said rod asymmetrical to the midpoint thereof, and means for applying an input signal to said third coil having a relatively low frequency with respect to the frequency of said alternating current power signal, said input signal changing the permeability of one side of said rod to a greater extent than the permeability of the other side of said rod in accordance with the variations of said input signal, the output signal of said device obtained across said first coil thereby being an alternating current signal having the same frequency as said alternating current power signal and modulated in accordance with said input signal at twice the frequency thereof.

3. The invention in accordance with claim 2, there being additionally provided: a fourth coil of wire wound all in the same direction on said rod asymmetrical to the midpoint thereof, the asymmetry of said fourth coil being opposite to that of said third coil, and means for applying a second input signal to said fourth coil.

4. A magnetic device for detecting the difference in phase and magnitude between first and second alternating current signals, said device comprising in combination: a ferromagnetic rod, a first coil of wire wound all in the same direction on said rod symmetrical about the midpoint thereof, a second coil of wire wound on the rod symmetrical about the midpoint of said rod, said second coil being wound in one direction on one side of the midpoint and in the other direction on the other side of the midpoint, means applying an alternating current power signal to one of said first and second coils, the voltage across the other of said first and second coils being the detected output signal of said device, a third coil of wire wound all in the same direction on said rod asymmetrical to the midpoint thereof, said first alternating current signal being applied to said third coil, and a fourth coil of wire wound all in the same direction on said rod asymmetrical to the midpoint thereof, said fourth coil being substantially the same as said third coil and having an asymmetry substantially equal and opposite to that of said third coil, said second alternating current signal being applied to said fourth coil, each of said first and second signals changing the permeability of its respective portion of said rod in accordance therewith, the detected output signal thereby having the same frequency as said alternating current power signal and having a modulation thereon indicative of the differences in phase and magnitude between said first and second signals.

References Cited in the file of this patent

UNITED STATES PATENTS

| | | |
|---|---|---|
| Re. 4,588 | Page | Oct. 10, 1871 |
| 1,575,824 | Eiffert | Mar. 9, 1926 |
| 2,082,121 | Rypinaki | June 1, 1937 |
| 2,568,587 | MacGeorge | Sept. 18, 1951 |
| 2,666,178 | Kramer | Jan. 12, 1954 |
| 2,741,757 | Devol et al. | Apr. 10, 1956 |